United States Patent [19]

Sluis et al.

[11] 3,989,679

[45] Nov. 2, 1976

[54] EPOXY RESIN POWDER COMPOSITION

[75] Inventors: Maarten Sluis; Jan H. De Kruif, both of Amsterdam, Netherlands

[73] Assignee: Shell Oil Company, Houston, Tex.

[22] Filed: Jan. 31, 1975

[21] Appl. No.: 546,170

[30] Foreign Application Priority Data

Feb. 4, 1974 United Kingdom.................. 5041/74

[52] U.S. Cl. ............................................. 260/78.41
[51] Int. Cl.$^2$.................. C08F 18/14; C08G 59/14; C08G 59/20
[58] Field of Search..................... 260/78.4 EP, 78.41

[56] References Cited
UNITED STATES PATENTS

| | | | |
|---|---|---|---|
| 2,801,232 | 7/1957 | Suen et al. .................... | 260/78.4 EP |
| 3,535,289 | 10/1970 | Kato et al. .................... | 260/78.4 EP |
| 3,576,827 | 8/1971 | Dukes et al. .................. | 260/78.4 EP |
| 3,692,715 | 9/1972 | Groff et al. ................... | 260/78.4 EP |

OTHER PUBLICATIONS

Encyclopedia of Polymer Science & Tech., Interscience Publishers, N.Y. 1967, pp. 232–234.

*Primary Examiner*—Joseph L. Schofer
*Assistant Examiner*—Maria S. Tungol

[57] ABSTRACT

Epoxy resin compositions which are solid at 25° C but which can be polymerized for application as a coating powder for outdoor use comprise (A) a solid epoxy-containing reaction product of a diglycidyl ester of a carbocyclic dicarboxylic acid and a dicarboxylic acid component consisting of mainly isophthalic acid and (B) a curing component consisting mainly of an aromatic tricarboxylic acid or anhydride.

7 Claims, No Drawings

EPOXY RESIN POWDER COMPOSITION

BACKGROUND OF THE INVENTION

In general, thermosetting resin powders for surface coating contain a binder composed of a curable resin which is solid at ambient temperature and melts above 60° C, and a latent curing agent which does not react with the solid thermosetting resin at ambient temperature, and which is also solid at ambient temperature with a melting point above 60° C. If the resin or curing agent softens below 60° C the mixture is difficult to pulverize, and the powder tends to block on storage.

It is known that solid polyglycidyl ethers of 2,2 bis(4-hydroxyphenyl) propane can be used as the binder component in coating powders, in combination with curing agents of the classes of amines, amides and polycarboxylic acid anhydrides. The use of epoxy resins as binder component in coating powders has the advantage, that during cure no volatile material is formed which could cause gas bells and blisters, resulting in imperfect films. However, coatings prepared from these powders have insufficient resistance to weathering conditions, in particular, to exposure to UV radiation, and are therefore in general not suitable for outdoor use.

It is also known that electrical insulators for outdoor use can be made by casting of a cycloaliphatic polyepoxide with a cycloaliphatic polycarboxylic acid anhydride as the curing agent, and curing the mixture by heat. Attractive cycloaliphatic polyepoxides for outdoor use are glycidyl esters of cycloaliphatic dicarboxylic acids such as hexahydrophthalic acid and bicyclo[2.2.1]heptane, 2,3-dicarboxylic acid. These esters are liquid at 25° C, and can therefore not be used as major binder components in coating powders.

It has been proposed in U.S. Pat. No. 3,535,289 to make a soluble fusible resin for coating powder application by reacting the diglycidyl ester of hexahydrophthalic acid with an equimolar amount of hexahydrophthalic acid. The resin, although solid at ambient temperature, has a higher epoxy equivalent weight than desirable for a powder coating component. On the other hand, if the amount of hexahydrophthalic acid is reduced to prepare a resin with an epoxy equivalent weight in the desired range, the product is liquid at room temperature, or melts too low to be useful in a powder coating composition.

It is generally regarded by those in the coatings art that in order to obtain epoxy resin-based coatings suitable for outdoor use, the use of aromatic components should be avoided.

It has now been found that certain epoxy resin compositions which do contain specific aromatic components can be used as binders in powder coating compositions with very good applicability for outdoor use.

SUMMARY OF THE INVENTION

The invention relates to epoxy resin compositions which are solid at 25° C, which can be pulverized for application as a coating powder, and which are particularly suitable for providing coatings for outdoor use.

More specifically, the invention is directed to an epoxy resin composition, solid at 25° C and fusible and curable at elevated temperatures, comprising (A) a solid fusible reaction product of (1) a polyglycidyl ester having from 1.5 up to 2.0 epoxy groups per molecule of a carbocyclic dicarboxylic acid and (2) a dicarboxylic acid component containing from about 50 to about 100%w of isophthalic acid, the reaction product having an epoxy equivalent weight of from 800 to 3,000, and (B) a curing amount of a polycarboxylic acid or anhydride thereof containing from about 50 up to 100%w of an aromatic polycarboxylic acid or anhydride thereof having at least three carboxyl functions per molecule.

DESCRIPTION OF THE PREFERRED EMBODIMENTS

Component A (1) is a polyglycidyl ester having from 1.5 to 2.0 epoxy groups per molecule of a carbocyclic dicarboxylic acid, preferably of a cycloaliphatic dicarboxylic acid having the formula

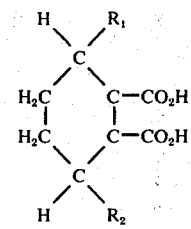

wherein $R_1$ and $R_2$ each taken separately, denote hydrogen atoms, or taken combined denote a methylene group. Examples of such cycloaliphatic acids are hexahydrophthalic and endomethylene hexahydrophthalic acid (bicyclo[2.2.1]heptane 2,3-dicarboxylic acid). Other preferred glycidyl esters are those of phthalic acid or isophthalic acid. Also, glycidyl esters of tetrahydrophthalic acid may be used.

The glycidyl esters can be prepared from the acids or their anhydrides or salts thereof and epichlorohydrin by methods known in the art. For obtaining polyglycidyl esters having from 1.5 up to 2.0 epoxy groups per molecule it is advisable to utilize an epichlorohydrin/carboxyl equivalent ratio of at least 3.5, and preferably of at least 5 or more. Suitable processes for the preparation of such polyglycidyl esters have been described in the British Pat. Nos. 1,173,711 and 1,205,180. With lower epichlorohydrin/carboxyl ratios the product may be a polyglycidyl ester which contains on an average more than 2.0 epoxy groups per molecule, a so-called "branched" ester, which will not be suitable for preparation of component A, because the time to gelation is too short at reaction temperature to allow dumping of gel-free product from a commercial-size reactor.

The component A (2) is a dicarboxylic acid component containing from about 50 up to 100%w of isophthalic acid. If a second dicarboxylic acid component is used in component A (2) a flexibilizing aliphatic or cycloaliphatic dicarboxylic acid having at least 6 carbon atoms per molecule, and preferably from 6 to 10 carbon atoms per molecule is preferred, and the amount of said dicarboxylic acid may be from 0 up to 50%w of the component A (2).

Examples of such aliphatic or cycloaliphatic flexibilizing dicarboxylic acids are adipic acid, sebacic acid, 2,2,4-trimethyl adipic acid, tetrahydrophthalic acid, hexahydrophthalic acid and methyl hexahydrophthalic acid. The presence of the flexibilizing dicarboxylic acid will improve the flexibility of the cured coating, and the flexibilizing properties will, in general, be optimized if the flexibilizing dicarboxylic acid is present in amounts of from about 15 to 25%w of the dicarboxylic acid component A (2).

In order to prepare the solid fusible reaction product A, the components A (1) and A (2) are mixed in one or more stages in an epoxy/carboxyl equivalent ratio of from 1.5:1 to 1.08:1, and reacted by heating at temperatures of from 100° to 150° C. As the reaction is exothermic, cooling means have to be applied, and the temperature during the reaction has to be watched closely to make sure that the reaction does not "run away," in which case the product will probably be a cross-linked infusible resin which would be unsuitable for use in the instant compositions. If large batches of resin A are prepared, it is preferred to add the dicarboxylic acid component A (2) gradually or in stages to the epoxy component A (1) to avoid extreme rises in temperature.

Catalysts to accelerate the reaction of the polyglycidyl ester and the dicarboxylic acid components may be added in some cases, but in general they are not advised, as the reaction is exothermic, and presence of accelerators may make it more difficult to keep the reaction under control.

The reaction product of components A (1) and A (2), if carried out according to recommendations above, will be a resinous material which is fusible and solid at ambient temperature, which is soluble in organic solvents such as ketones and glycol ethers, and which will have an epoxy equivalent weight of from 800 to 3,000.

The curing component B of the present composition is a polycarboxylic acid or anhydride thereof containing from about 50 up to 100%w of an aromatic polycarboxylic acid or anhydride thereof having at least three carboxyl functions per molecule. The preferred aromatic polycarboxylic acid or anhydride thereof having at least three carboxyl functions per molecule is trimellitic anhydride. Other similar components within the scope of this definition are monoalkyl esters of pyromellitic acid monoanhydride and/or benzophenone 3,3',4,4'-tetracarboxylic acid monoanhydride. A carboxyl group has one carboxyl function, and an anhydride group in this respect has two carboxyl functions, as the anhydride group may be easily hydrolyzed by water to obtain two carboxyl groups.

Other components of the curing material B may be aromatic, cycloaliphatic or aliphatic dicarboxylic acids or anhydrides thereof, being used in amounts of from about 0 up to about 50%w, preferably from 0 to about 20%w, of the total weight of component B, such as phthalic anhydride, tetrahydrophthalic anhydride, hexahydrophthalic anhydride, methyl hexahydrophthalic anhydride, polyazelaic polyanhydride, and similar compounds, and mixtures thereof. If a flexibilizing dicarboxylic acid has been used in a component A (2), it is in general not advised to use a dicarboxylic acid anhydride material in component B, as this may reduce the melting point of the material to a level where milling becomes difficult, or where blocking of the milled powder on storage may occur.

The amount of component B is, in general, from about 1.0 to 3.0 times and preferably from 1.5 to 2.5 times the stoichiometric amount, calculated on the epoxy content of the component A.

The resin components A and B may be mixed with usual additives for coating powders such as pigments, fillers, flow control agents, anticratering agents, and the like. These additives may be added during the blending of components A and B, e.g., by dry blending, mill blending, or fusion blending. The fusion blending may be performed by mixing the ingredients in a heated Z-blade mixer, on hot rolls, or in an extruder; extruders have the advantage of a very short fusion-blending time so that they can be used for making large quantities of formulations which would be difficult to compound on a Z-blade mixer. The cooled solid material can then be ground (for example, in a pin disk mill) and sieved to obtain a powder of the desired particle size, for example from 100 to 350 microns for use in a fluidized bed, in an electrostatic fluidized bed or in with a flock gun, or below 75 microns for electrostatic spraying or use in a cloud chamber.

Coating powders based on epoxy resin compositions according to the invention can be applied to a variety of substances; in particular, metals such as steel and tin plate, and can be cured by heating, for example, to temperatures between 150° and 220° C, for various periods of time, and provide smooth, strong, resistant coatings.

The invention is illustrated by the following illustrative embodiments. Parts therein are parts by weight. Components A (1) and A (2) were mixed in a reaction vessel with stirring, and heated to the desired reaction temperature, and kept at that temperature until low acid number of the product indicated essentially complete disappearance of free carboxyl groups. The melting points were measured with a Mettler FP apparatus, with a temperature increase of 2° C per minute. Gelation time is the total time that the initial mixture can be kept at reaction temperature until gelation occurs.

The compositions were evaluated as coating powders in the following formulation:

| | |
|---|---|
| Fusible reaction product A | 100 parts by weight |
| TiO₂ pigment | 50 parts by weight |
| Modaflow (flow control agent) | 0.3 parts by weight |
| Mowital | 3.0 parts by weight |
| Aerosol (thixotroping agent) | 0.5 parts by weight |
| Curing agent (component B) | various amounts, expressed in parts by weight per 100 parts by weight of component A (abbreviated as phr, parts per hundred parts of resin) |

The components were dry-blended, and then fusion-blended on a two-roll mill for 4 to 7 minutes at temperatures between 90° and 110° C; the blend was cooled and ground and sieved to a particle size of below 75 micron. The powders were applied by electrostatic spraying onto steel panels; the film thickness after cure was 50–70 microns. MIBK is an abbreviation for methylisobutylketone.

EXAMPLE I

Resin based on diglycidyl ester of phthalic acid, 1.39 epoxy equivalent of a diglycidyl ester of phthalic acid (having an epoxy equivalent weight of 166 and a molecular weight of 301, therefore containing on average 1.81 epoxy groups per mole) was reacted with isophthalic acid (1.0 acid equivalent) at 150° C during 125 minutes. The product had an epoxy equivalent weight of 950, a melting point of 74° C, and an acid value of 4 meq/100g.

This resin was formulated according to the standard formulation described above with trimellitic anhydride (10.1 phr), and the powder applied to steel panels. The cure schedule was 30 minutes at 200° C. The film properties were:

| | |
|---|---|
| Hardness (Buchholz) | 105 |
| Whiteness | 75 |
| Impact resistance (cm kg) | <5.5 |
| Solvent resistance: | |
| xylene, 15 minutes | excellent |
| MIBK, 15 minutes | excellent |
| Artificial weathering (in Weather-o-meter): | |
| gloss (%) initial | 64 |
| gloss after 200 hours | 63 |
| gloss after 400 hours | 59 |
| gloss after 800 hours | 43 |

The powder stability (measured after 2 weeks at 40°–43° C) was very good.

EXAMPLE II

Diglycidyl ester of phthalic acid (the same as in Example I; 1.18 epoxy equivalent) was reacted with a mixture of isophthalic acid (0.7 acid equivalent) and adipic acid (0.3 acid equivalent) at 150° C during 105 minutes. The product had an epoxy equivalent weight of 1980, a melting point of 79° C, and an acid value of 5 meq/100 g.

The resin was formulated with trimellitic anhydride (12.2 phr) according to the standard formulation, the powder was applied to steel panels; the cure schedule was 30 minutes at 200° C. The film properties were:

| | |
|---|---|
| Hardness (Buchholz) | 100 |
| Whiteness | 67 |
| Impact resistance (cm kg) | 7.9 |
| Solvent resistance: xylene, 15 minutes | excellent |
| MIBK, 15 minutes | excellent |
| Artificial weathering (Weather-o-meter) | |
| gloss initial (%) | 78 |
| gloss after 400 hours | 81 |
| gloss after 800 hours | 78 |
| gloss after 1200 hours | 76 |
| gloss after 1600 hours | 65 |

EXAMPLE III

Resins based on diglycidyl ester of hexahydrophthalic acid having an epoxy equivalent weight of 158 and a molecular weight of 285, therefore containing on average 1.8 epoxy groups per molecule.

The diglycidyl esters were mixed and reacted with isophthalic acid and a mixture of isophthalic acid and adipic acid in the amounts indicated in Table I, which also gives details of reaction conditions and product properties. Details of formulation into a powder (standard formulation, with various amounts of component B, trimellitic anhydride) and evaluation results of films from these powders on steel panels are given in Table II.

Table I

| Experiment No. | a | b | c | d | e |
|---|---|---|---|---|---|
| Epoxy equivalents of diglycidyl ester | 1.47 | 1.30 | 1.23 | 1.13 | 1.09 |
| Acid equivalents of isophthalic acid | 1.0 | 1.0 | 1.0 | 0.7 | 0.5 |
| Acid equivalents of adipic acid | — | — | — | 0.3 | 0.5 |
| Reaction temp., ° C | 150 | 150 | 150 | 150 | 150 |
| Reaction time, minutes | 60 | 70 | 70 | 60 | 60 |
| Properties product: | | | | | |
| Epoxy equivalent wt. | 800 | 1190 | 1250 | 2130 | 2950 |
| Melting point, ° C | 68 | 80 | 80 | 80 | 75 |
| Acid value, meq/100 g | 3 | 6 | 21 | 12 | 14 |

Table II

| Experiment number | a | b | c | d | e |
|---|---|---|---|---|---|
| Component B: trimellitic anhydride | 12 phr | 8 phr | 12 phr | 12 phr | 12 phr | 12 phr |
| Stoving schedule: 30 minutes at ° C | 200 | 200 | 200 | 180 | 180 | 180 |
| Film properties: | | | | | | |
| Hardness (Buchholz) | 105 | 105 | 100 | 95 | 95 | 100 |
| Whiteness | 71 | 61 | 60 | 78 | 79 | 80 |
| Impact resistance (cm kg) | 7.9 | 7.9 | 9 | <5.5 | 6.7 | 11 |
| Erichsen penetration, (mm) | 5.3 | 7.5 | 7.5 | 5.8 | 7.4 | 7.1 |
| Mandrel bend (cm) | 1.25 | 1.25 | 0.6 | 1.25 | 0.15 | 0.3 |
| Artificial weathering (Weather-o-meter): | | | | | | |
| gloss(%) initial | 40 | 35 | 49 | 51 | 67 | 70 |
| gloss after 200 hours | 48 | 43 | 52 | 54 | 67 | 68 |
| gloss after 400 hours | 44 | 42 | 48 | 51 | 68 | 67 |
| gloss after 800 hours | 43 | 39 | 47 | 42 | 59 | 64 |
| gloss after 1200 hours | 35 | 33 | 42 | 37 | 60 | 64 |
| gloss after 1600 hours | 38 | 36 | 38 | 38 | 50 | 51 |
| gloss after 2000 hours | 32 | 29 | 32 | 23 | 37 | 34 |

In all experiments the 15 minutes' resistance to xylene and MIBK was excellent.

EXAMPLE IV (comparative example)

For comparison with Example III, a diglycidyl ester of hexahydrophthalic acid having an epoxy equivalent weight of 158 and a molecular weight of 319, therefore and epoxy functionality of 2.02 was used. 1.28 epoxy equivalent of this ester was reacted with 1.0 acid equivalent of isophthalic acid at 145° C during 60 minutes; the gelation time at this temperature was only 80 minutes, so that insufficient time was available for further processing of the product. The gelation time for the corresponding resin b of example III was 160 minutes, which allowed further processing of the ester before gelation occurred.

EXAMPLE V

Resins prepared from diglycidyl ester of endomethylene hexahydrophthalic acid (bicyclo[2,2,1]heptane-2,3-dicarboxylic acid), having an epoxy equivalent weight of 193 (molecular weight 346; 1.76 epoxy groups per mole), and isophthalic acid and mixtures thereof with 2,2,4-trimethyl adipic acid.

Amounts of components, reaction conditions and product properties are summarized in the first part of Table III. Details of powder coating formulation, curing conditions, and film properties are collected in the second part of Table III.

Table III

| Experiment number | f | g | h |
| --- | --- | --- | --- |
| Epoxy equivalents of diglycidyl ester | 1.34 | 1.23 | 1.15 |
| Acid equivalents of isophthalic acid | 1.0 | 1.0 | 0.7 |
| Acid equivalents of 2,2,4-trimethyl adipic acid | — | — | 0.3 |
| Reaction temperature, °C | 145 | 145 | 145 |
| Reaction time, minutes | 90 | 90 | 90 |
| Properties product: | | | |
| Epoxy equivalent weight | 1026 | 1333 | 1955 |
| Melting point, °C | 67 | 76 | 76 |
| Component B: trimellitic anhydride | 12 phr | 12 phr | 12 phr |
| Storing schedule: | | | |
| 30 minutes at °C | 200 | 200 | 200 |
| Film properties | | | |
| Hardness (Buchholz) | 105 | 110 | 111 |
| Whiteness | 74 | 70 | 57 |
| Impact resistance(cm kg) | 22.5 | 56 | 39 |
| Erichsen penetration (mm) | 7.2 | 7.8 | <8 |
| Mandrel bend (cm) | 0.15 | 0.3 | 0.15 |
| Artificial weathering (Weather-o-meter) | | | |
| gloss(%) initial | 84 | 85 | 78 |
| gloss after 200 hours | 84 | 84 | 78 |
| gloss after 400 hours | 86 | 85 | 80 |
| gloss after 800 hours | 76 | 79 | 76 |
| gloss after 1200 hours | 48 | 58 | 54 |
| gloss after 1600 hours | 30 | 41 | 39 |
| gloss after 2000 hours | 23 | 30 | 28 |

In all experiments the 15 minutes' resistance to xylene and MIBK was excellent.

We claim as our invention:

1. An epoxy resin composition, solid at 25° C and fusible and curable at temperatures above about 150° C, comprising (A) a solid, fusible reaction product of (1) a polyglycidyl ester having from 1.5 to 2.0 epoxy groups per molecule of a carbocyclic dicarboxylic acid and (2) a dicarboxylic acid component containing from about 0% to 50% by weight of at least one aliphatic or cycloaliphatic dicarboxylic acid having at least 6 carbon atoms per molecule and from about 50 to 100% by weight of isophthalic acid, said reaction product having an epoxy equivalent weight of from about 800 to 3000 and being prepared by reacting components A (1) and A (2) in the epoxy/carboxy equivalent ratio of from 1.5:1 to 1.08:1.0 at a temperature of from about 100° to 150° C and (B) a curing amount of a polycarboxylic acid or anhydride thereof containing from about 50 to 100 percent by weight of an aromatic polycarboxylic acid or anhydride thereof having at least three carboxyl functions per molecule.

2. The epoxy resin composition as in claim 1, wherein the aliphatic or cycloaliphatic dicarboxylic acid in component A (2) is selected from the group consisting of adipic acid, sebacic acid, 2,2,4-trimethyl adipic acid, tetrahydrophthalic acid, hexahydrophthalic acid, and methyl hexahydrophthalic acid.

3. The epoxy resin composition as in claim 1, wherein component A (1) is a polyglycidyl ester of a cycloaliphatic dicarboxylic acid having the formula:

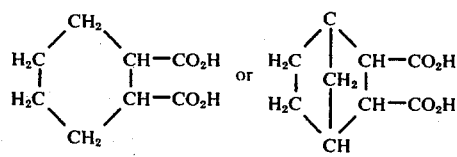

4. The epoxy resin composition as in claim 1, wherein component A(1) is a polyglycidyl ester of phthalic acid or isophthalic acid.

5. The epoxy resin composition as in claim 1, wherein the aromatic polycarboxylic acid or anhydride thereof having at least three carboxyl functions per molecule is trimellitic anhydride.

6. The epoxy resin composition as in claim 1, wherein the curing amount of the polycarboxylic acid or anhydride thereof of (B) is from 1.5 to 2.5 times the stoichiometric amount.

7. The epoxy resin composition as in claim 1, in the form of a powder having a particle size not greater than about 35 microns.

* * * * *